United States Patent
Mima et al.

(10) Patent No.: US 7,276,167 B2
(45) Date of Patent: Oct. 2, 2007

(54) METHOD OF ADDING ACTIVATED CARBON IN WATER PURIFICATION AND METHOD OF WATER PURIFICATION

(75) Inventors: Satoru Mima, Handa (JP); Nobuhiro Aoki, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 0 days.

(21) Appl. No.: 10/540,535

(22) PCT Filed: Jan. 16, 2004

(86) PCT No.: PCT/JP2004/000312

§ 371 (c)(1),
(2), (4) Date: Jun. 24, 2005

(87) PCT Pub. No.: WO2004/063097

PCT Pub. Date: Jul. 29, 2004

(65) Prior Publication Data

US 2006/0016758 A1    Jan. 26, 2006

(30) Foreign Application Priority Data

Jan. 16, 2003  (JP)  ............................. 2003-007840

(51) Int. Cl.
*C02F 1/28*   (2006.01)

(52) U.S. Cl. ....................................... 210/663; 210/694
(58) Field of Classification Search ................ 210/663, 210/694
See application file for complete search history.

(56) References Cited

U.S. PATENT DOCUMENTS 5,268,106 A * 12/1993 Allen et al. .................. 210/680
6,602,816 B1 * 8/2003 Hatano et al. ................ 502/81

FOREIGN PATENT DOCUMENTS

| JP | A 10-309567 | 11/1998 |
| JP | A 2000-140677 | 5/2000 |
| JP | A 2000-263039 | 9/2000 |

OTHER PUBLICATIONS

Carlos, Campos et al.; *Atrazine Removal By Powdered Activated Carbon In Floc Blanket Reactors*; Water. Research.; vol. 34; No. 16; pp. 4070-4080; Nov. 2000.

* cited by examiner

*Primary Examiner*—Matthew O. Savage
(74) *Attorney, Agent, or Firm*—Oliff & Berridge, PLC

(57) ABSTRACT

When a raw water to be filtered c is fed from a raw water tank 11 reservoiring a raw water (water to be treated) to a membrane module by a raw water pump P1, an activated carbon raw material supplied from an activated carbon tank is milled together with water to be mixed by a wet milling device, and added and mixed into the raw water tank as an aqueous suspension containing activated carbon fine particles having an average particle size of 0.1 μm to 10 μm, thus producing the raw water to be filtered (activated carbon-containing water to be treated). The raw water to be filtered (activated carbon-containing water to be treated) is filtered by the membrane module at a subsequent step, thereby obtaining a purified water.

8 Claims, 1 Drawing Sheet

METHOD OF ADDING ACTIVATED CARBON IN WATER PURIFICATION AND METHOD OF WATER PURIFICATION

TECHNICAL FIELD

The present invention relates to a method of adding activated carbon in water purification and a method of water purification to improve quality of purified water by adsorption of the activated carbon.

BACKGROUND ART

A water treatment apparatus, for example, utilizing activated carbon as shown in FIG. 2 has been known as an apparatus to purify river water to obtain purified water of high quality. In a technique disclosed here, water to be treated is fed from a raw water tank 11 reservoiring a raw water (a) through passages 12, 13 by a raw water pump P1, a circulation pump P2 to a membrane module 14 where suspended solids (SS) are removed, thereby a purified water (b) is obtained. In case of the apparatus shown as example, the apparatus is configured to return water to be treated through a passage 15 for circulation.

Furthermore, in the instance shown in this figure, organic substances such as abnormal taste and odor causing materials, coloring materials and the trihalomethane precursors in the raw water (a) is removed by adding, from powder activated carbon injection means 16, activated carbon of ultra-fine particle powder having a particle size of 0.01 μm to 10 μm, instead of activated carbon powder having a particle size of about 18 μm which has heretofore been used.

However, in such a known method, there has been used activated carbon of ultra-fine particle powder having been milled in advance by a certain method to have a particle size of 0.01 μm to 10 μm, however, such activated carbon of ultra-fine particle powder in itself is apt to aggregate and easily forms a secondary aggregate; thus, there is a problem that effects of careful selection of ultra-fine particle powder are not sufficiently attained. Moreover, there is also such a disadvantage that fine particle powder causes dust in handling.

The present invention has been made to solve the problems described above, and is intended to provide a method of adding activated carbon in a water purification treatment and method of water purification treatment, wherein secondary aggregation of the activated carbon ultra-fine particles can be suppressed to make full use of its adsorption performance and the dusting of activated carbon fine particles during handling can be prevented, in the water purification treatment by which the quality of purified water is improved by utilizing the adsorption of the activated carbon.

DISCLOSURE OF THE INVENTION

The present invention has been made to achieve the aforementioned objects, and there is provided according to the present invention a method of adding activated carbon in water purification treatment by adding activated carbon to water to be treated to purify the water to be treated, characterized in that an aqueous suspension containing activated carbon fine particles having an average particle size of 0.1 μm to 10 μm obtainable by wet milling of the particles of the activated carbon is added to water to be treated.

Furthermore, according to the present invention, there is provided a water treatment method of purifying a water to be treated by use of activated carbon, characterized by adding, to water to be treated, an aqueous suspension containing the activated carbon fine particles having an average particle size of 0.1 μm to 10 μm obtainable by wet milling of the particles of the activated carbon, and by further subjecting the obtained activated carbon-containing water to be treated to a membrane separation treatment.

In the present invention, a concentration of activated carbon in the aqueous suspension containing activated carbon fine particles is preferably 0.1 mass percent to 10 mass percents.

Furthermore, a milling machine is preferably installed by attaching it to a passage of the water to be treated or to a tank reservoiring water to be treated, so that activated carbon particles are subjected to wet milling by the milling machine.

The method of adding activated carbon in the water purification treatment and the method of water purification treatment according to the present invention are constructed as described above, so that the secondary aggregation of activated carbon fine particles can be suppressed, thereby its adsorption performance can be fully utilized and the dusting of activated carbon fine particles can be prevented. Further, a cheap activated carbon raw material can be used, and the cost reduction is attained therefore. Still further, a working environment can be improved. Thus, the present invention has a great industrial value as a method of adding activated carbon in the water purification treatment and the method of water purification treatment capable of solving the conventional problems.

BEST MODE FOR CARRYING OUT THE INVENTION

Figure 1:
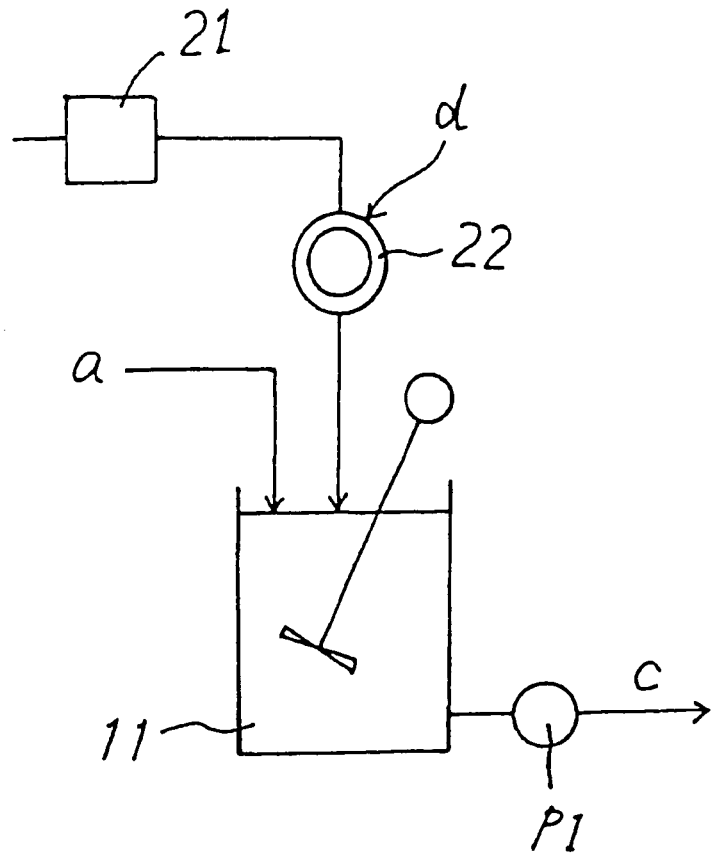
FIG. 1 is a flow diagram of essential parts of a water treatment apparatus to explain an activated carbon addition method of the present invention.

A best mode for carrying out a method of adding activated carbon in water purification and a water treatment method of the present invention will hereinafter be described in detail referring to the drawings.

As shown in FIG. 1, in the present invention, when a raw water to be filtered (c) is fed from a raw water tank 11 reservoiring a raw water (water to be treated) (a) such as river water to a membrane module (not shown) by a raw water pump P1, an activated carbon raw material supplied from an activated carbon tank 21 is put into a water to be mixed (d), and then milled by a wet milling device 22, and added and mixed into the raw water tank 11 as an aqueous suspension containing activated carbon fine particles having an average particle size of 0.1 μm to 10 μm, thus producing the raw water to be filtered (activated carbon-containing water to be treated) (c). The features of the present invention lies in the point that the activated carbon fine particles thus milled are used in a state co-existing with water without undergoing a dried state.

Here, the average particle size of the activated carbon fine particles used in the present invention means a volume mean diameter, and is obtained by measurement using a laser diffraction scattering method.

Figure 2:
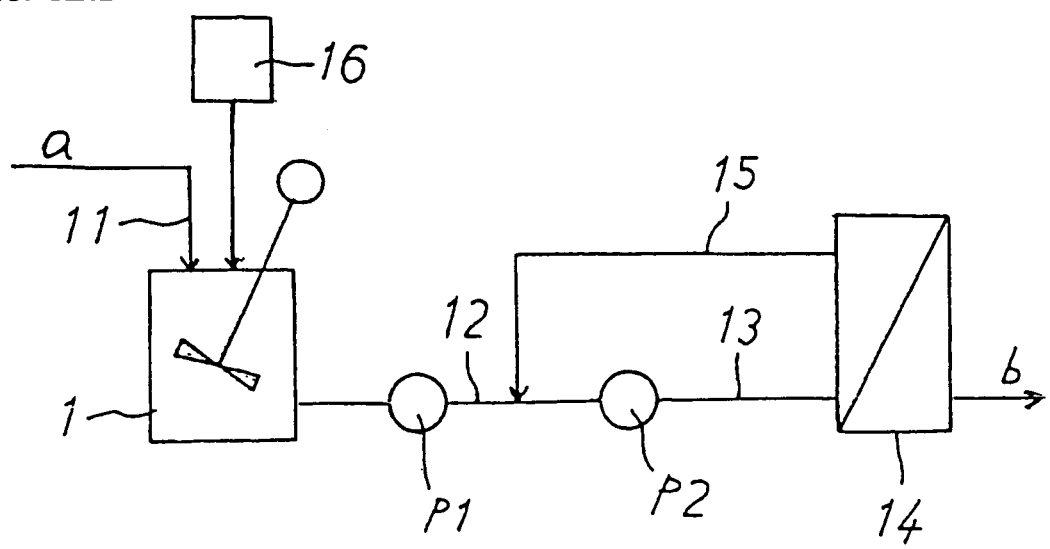
FIG. 2 is a flow diagram of a conventional water treatment apparatus using activated carbon.

The raw water to be filtered (activated carbon-containing water to be treated) (c) to which such activated carbon fine particles are added is filtered by the membrane module at a subsequent step as in the case shown in FIG. 2, thereby allowing a purified water (b) to be obtained. In this case, the aqueous suspension containing activated carbon fine particles obtainable by the wet milling device 22 is added into the raw water tank 11, but may be injected directly into a supply passage of the raw water (water to be treated) (a) to produce the raw water to be filtered (activated carbon-containing water to be treated) (c).

The average particle size of the activated carbon fine particles used in the present invention is within a range of 0.1 μm to 10 μm as described above, and is preferably in a range of 0.5 μm to 10 pn. When the average particle size is below 0.1 μm, for example, when a microfiltration (MF) membrane treatment is combined, the activated carbon fine particles are difficult to separate by the MF membrane treatment, and when the average particle size is above 10 μm, the full advantage of the present invention cannot be attained effectively since one may use commercially available products having an average particle size of above 10 μm. Moreover, when the average particle size is 0.5 μm or above, complete capture can be achieved by an MF membrane surface, so that the activated carbon fine particles do not penetrate into the membrane, thereby an efficient membrane filtration can be attained.

According to the present invention, the activated carbon raw material is subjected to wet milling, and the obtained activated carbon fine particles are dispersed into the aqueous suspension and added in a state not to cause secondary aggregation, so that an adsorption effect of organic matters and the like in the raw water can be sufficiently displayed. Further, the commercially available products having an average particle size of above 10 μm can be used for the activated carbon raw material, which is an advantage in that it is easy to purchase and cheap in the raw material costs. Also, there is an advantage that no dusting problem occurs since the activated carbon fine particles are handled as the aqueous suspension in the present invention, and that the used activated carbon raw material has a large particle size to cause no powder dust and is thus easy to handle.

The preferable particle size of the activated carbon fine particles used in the present invention has been as described above, but there is also an advantage that an adjustment can be properly made to have an optimum value for a particle size obtained by adjusting an operating condition of the wet milling device 22 in dependence upon a purification object and upon a filtration size of a filtration membrane of the membrane module at the subsequent step (e.g., an adjustment is made in dependence upon a use target and upon the purpose; for example, the particle size is reduced when adsorption properties are considered by priority, or the particle size is made larger when the efficiency of biological activated carbon is required).

It is to be noted that the membrane separation treatment (membrane module) used in the present invention includes, for example, a monolith type ceramic membrane as a preferred example.

Furthermore, the wet milling device used in the present invention is not specifically limited as long as it is of a type capable of milling activated carbon after putting it into water to be mixed (d) for dispersion, but the wet milling device can include, as a preferred example, a fine milling device such as a roll ball mill, an oscillating ball mill or an attriter mill having a ball or a rod as a milling medium.

Still further, a concentration of the activated carbon in the aqueous suspension containing the activated carbon fine particles used in the present invention is preferably within a range of 0.1 mass percent to 10 mass percents. If it is below 0.1%, the raw water to be filtered (c) is diluted, and treatment efficiency in the membrane module at the subsequent step may decrease. If it is above 10%, the activated carbon fine particles may easily cause the secondary aggregation.

EXAMPLES

An example of the present invention and comparative examples are shown below in Table 1. In Table 1, activated carbon fine particles obtained by the present invention were used in the example. In the example of the present invention in which there was used a test solution containing organic impurities at a predetermined concentration, an addition amount of the activated carbon fine particles was regarded as 100 when the contained organic impurities could be removed therefrom, and in Comparative Examples 1 and 2, addition amounts of activated carbons which were required to obtain the same effect as the above level of 100 are shown as relative amounts in Table 1.

According to these results, it was found that the present invention could provide a similar effect in addition amounts of 67% and 33% of the amounts of the activated carbons in Comparative Examples 1 and 2, respectively, and the present invention could sufficiently demonstrate an effect of milling of the activated carbon.

TABLE 1

|  | Addition amount | Kind of activated carbon |
| --- | --- | --- |
| Example | 100 | Activated carbon wet milling: particle size (average) 1.0 μm |
| Comparative Example 1 | 150 | Power dried for 24 hours after wet milling at a particle size 1.0 μm |
| Comparative Example 2 | 300 | Commercially available product of particle size of 15 μm |

INDUSTRIAL APPLICABILITY

The present invention is preferably utilized in various kinds of industrial fields where a water to be treated such as a river water or a certain industrial water needs to be efficiently purified to obtain purified water of high quality.

The invention claimed is:

1. A method of adding activated carbon in water purification treatment comprising:
   milling the activated carbon in situ in a water treatment plant; and
   adding activated carbon to purify water to be treated, characterized by an aqueous suspension containing activated carbon fine particles having an average particle size of 0.1 μm to 10 μm obtained by wet milling of the particles of the activated carbon is added to the water to be treated.

2. The addition method of activated carbon in the water purification treatment according to claim 1, wherein a concentration of the activated carbon in an aqueous suspension containing the activated carbon fine particles is 0.1 mass percent to 10 mass percents.

3. The addition method of activated carbon in the water treatment according to claim 2, wherein a milling machine is installed by attaching to a passage of the water to be treated or to a tank reservoiring water to be treated, so that the activated carbon particles are subjected to wet milling by the milling machine.

4. The addition method of activated carbon in the water treatment according to claim 1, wherein a milling machine is installed by attaching to a passage of the water to be treated or to a tank reservoiring water to be treated, so that the activated carbon particles are subjected to wet milling by the milling machine.

5. A water treatment method of purifying water to be treated by use of activated carbon, the method comprising:
   milling the activated carbon in situ in a water treatment plant;
   adding, to water to be treated, an aqueous suspension containing activated carbon fine particles having an average particle size of 0.1 μm to 10 μm obtained by wet milling of the particles of the activated carbon; and
   subjecting an obtained activated carbon-containing water to be treated to a membrane separation treatment.

6. The water treatment method according to claim 5, wherein a concentration of activated carbon in the aqueous suspension containing the activated carbon fine particles is 0.1 mass percent to 10 mass percents.

7. The water treatment method according to claim 6, wherein milling machine is installed by attaching to a passage of water to be treated or to a tank reservoiring water to be treated, so that the activated carbon particles are subjected to wet milling by the milling machine.

8. The water treatment method according to claim 5, wherein milling machine is installed by attaching to a passage of water to be treated or to a tank reservoiring water to be treated, so that the activated carbon particles are subjected to wet milling by the milling machine.

* * * * *